United States Patent [19]

Allen

[11] 4,038,682
[45] July 26, 1977

[54] VIDEO DISC PLAYER APPARATUS FOR ESTABLISHING ELECTRICAL CONNECTION BETWEEN A STYLUS ELECTRODE AND A SIGNAL PROCESSING CIRCUIT

[75] Inventor: James Austin Allen, Monrovia, Ind.

[73] Assignee: RCA Corporation, New York, N.Y.

[21] Appl. No.: 667,310

[22] Filed: Mar. 16, 1976

[30] Foreign Application Priority Data

Sept. 18, 1975 United Kingdom ............... 38458/75
Nov. 28, 1975 United Kingdom ............... 49108/75

[51] Int. Cl.² .......................................... G11B 25/04
[52] U.S. Cl. ................................. 358/128; 274/23 A
[58] Field of Search .................. 178/6.6 R, 6.6 DD; 179/100.41 R, 100.41 G, 100.4 R; 274/37, 23 R, 23 A

[56] References Cited

U.S. PATENT DOCUMENTS

| 3,873,762 | 3/1975 | Taylor | 178/6.6 A |
| 3,873,783 | 3/1975 | Leedom | 179/100.4 R |
| 3,952,145 | 4/1976 | Allen | 178/6.6 R |
| 3,952,147 | 4/1976 | Leedom | 178/6.6 R |
| 3,956,581 | 5/1976 | Taylor | 274/23 R X |

*Primary Examiner*—Bernard Konick
*Assistant Examiner*—John H. Wolff
*Attorney, Agent, or Firm*—Eugene M. Whitacre; William H. Meagher; Dilip A. Kulkarni

[57] ABSTRACT

A video disc player includes a carriage supporting signal processing circuitry having an electrical input terminal. A pickup cartridge which is removably mounted in said carriage contains a stylus and an electrical connection between an electrode on said stylus and a terminal on the cartridge. The cartridge terminal engages the input terminal of the signal processing circuitry under operating conditions. During installation of the cartridge in the carriage, cartridge projections cooperate with cam surfaces provided in the carriage to hold the terminal on the cartridge in spaced relation to the input terminal until the two terminals are aligned, to prevent a shearing motion therebetween.

6 Claims, 15 Drawing Figures

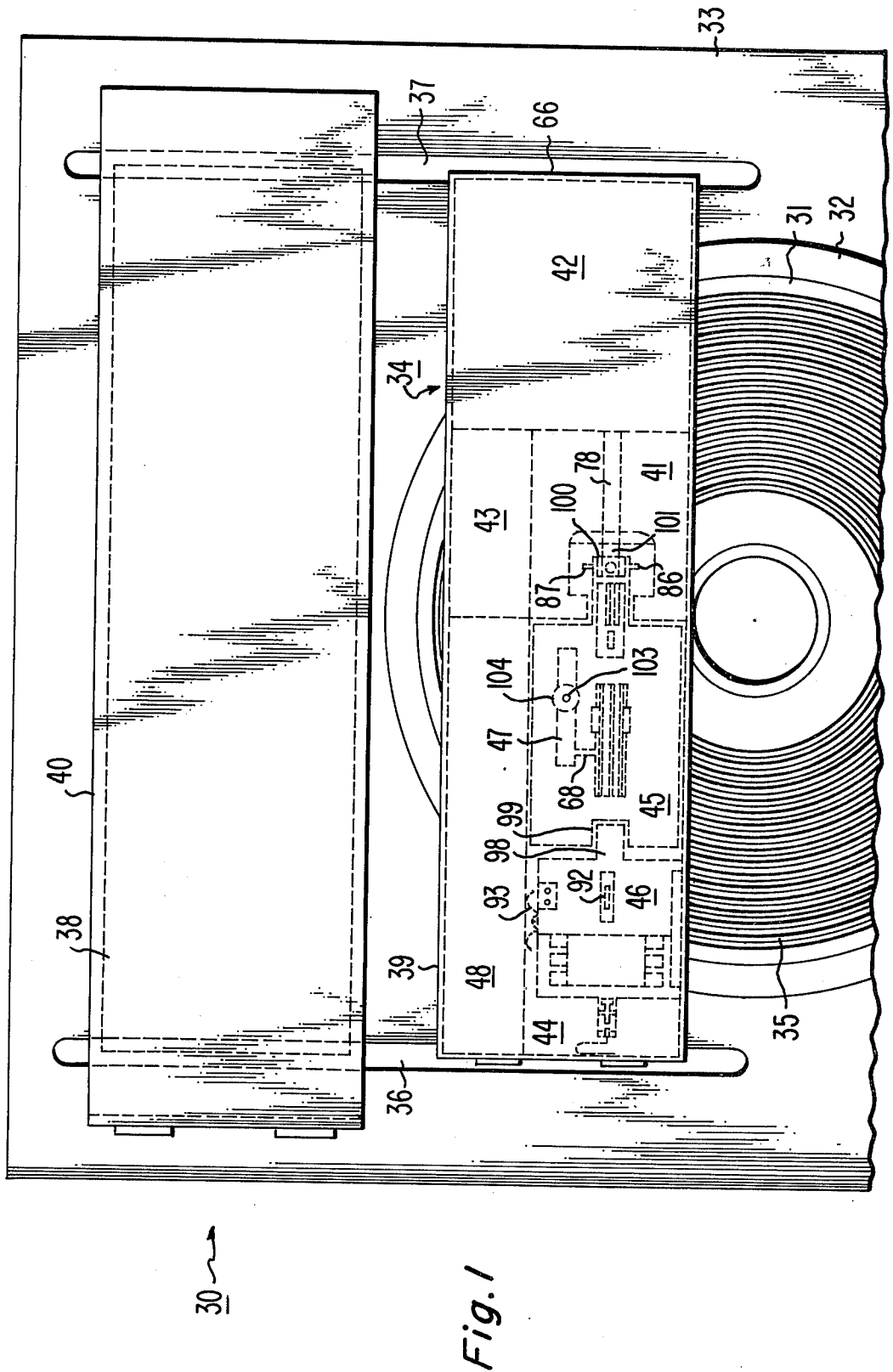

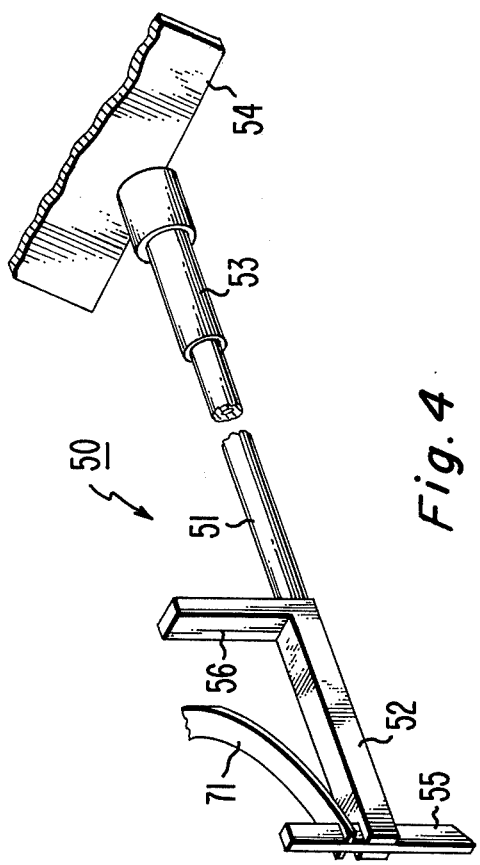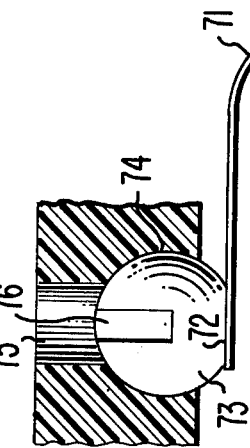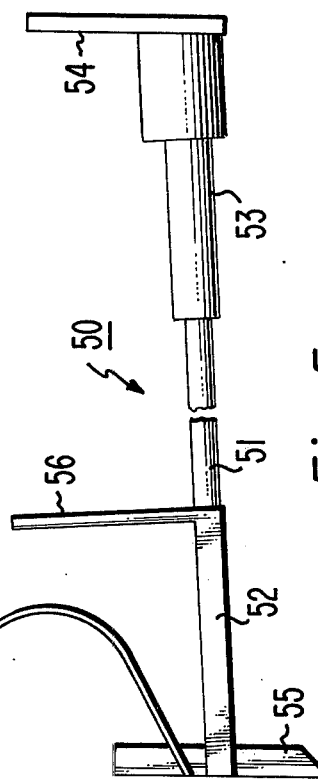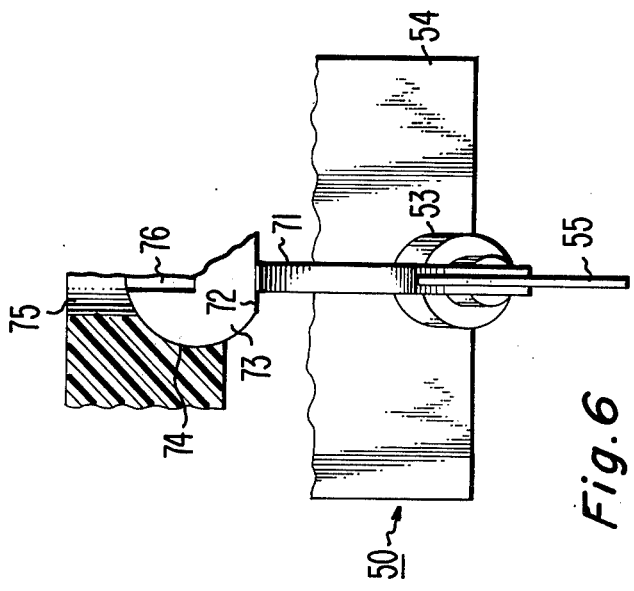
Fig. 4
Fig. 5
Fig. 6

VIDEO DISC PLAYER APPARATUS FOR ESTABLISHING ELECTRICAL CONNECTION BETWEEN A STYLUS ELECTRODE AND A SIGNAL PROCESSING CIRCUIT

The invention relates to a video disc player apparatus including a replaceable pickup cartridge.

In a video disc player of the type described in U.S. Pat. No. 3,842,194, issued to J. K. Clemens, a stylus arm, carrying a stylus at one end and a connector plate secured to its other end via a compliant member, may advantageously be treated as a replaceable unit of a size convenient to handle, whereby when the stylus wear calls for a replacement, the user may readily remove and replace the stylus arm unit without requirements for mechanical skill and dexterity. In copending U.S. patent applications of (1) M. A. Leedom, Ser. No. 522,815, now U.S. Pat. No. 3,952,147, and (2) J. A. Allen, Ser. No. 522,821, now U.S. Pat. No. 3,952,145, replaceable cartridges for enclosing the stylus arm unit are disclosed. Such cartridges are removably mounted in a carriage which is subject to translatory motion with respect to the player's turntable.

The stylus needs a certain tracking force to assure proper tracking and seating of the stylus in the record groove during playback. All of the tracking force may come from the weight of the stylus arm unit, whereby the tracking is, essentially, mass controlled along the record groove. However, as disclosed in the copending U.S. Pat. application, Ser. No. 667,307, of A. R. Dholakia entitled, VIDEO DISC PLAYER EMPLOYING A SPRING LOADED STYLUS APPARATUS, and filed concurrently herewith, it is preferable to employ a stylus arm unit having a mass lower than that required for desirable tracking force, and to provide a spring connected between the stylus and the carriage to impart a portion of the desired tracking force. It has been found that such an arrangement substantially reduces the duration of signal drop-outs during playback, because the leaf spring causes the stylus to quickly return to the record groove when the stylus is deflected away from the surface of the record by a defect in the record groove. The Dholakia application has been assigned of record to the assignee of the instant application.

The aforementioned leaf spring, in addition to its mechanical function, desirably serves an electrical function, establishing an electrical path between an electrode formed on the stylus and an input terminal of a signal processing circuit fixedly located in the carriage. It is the purpose of the present invention to provide a cartridge installation system that permits establishing an electrical connection between one end of the spring and the input terminal of the circuit without shearing motion therebetween, to protect the leaf spring from being torn off the cartridge during insertion of the cartridge in the carriage compartment.

In accordance with an embodiment of the present invention, a cartridge houses a stylus arm having a stylus secured to one end, with the other end of the stylus arm flexibly supported within the cartridge. One end of a conductive spring is attached to the stylus, while the second end of the conductive spring is secured within the cartridge. Means are provided for causing lateral displacement of the cartridge within the player's carriage, after cartridge insertion in a carriage compartment housing the input terminal of signal processing circuitry. Means, including a cam surface presented by a structure in the carriage compartment, are provided for elevating the second end of the conductive spring relative to the input terminal during the lateral displacement. The elevating means permit lowering of the second end of the conductive spring when it overlies the input terminal to establish the desired electrical connection therebetween. In the accompanying drawings:

FIG. 1 illustrates a video disc playback system including a stylus arm cartridge subject to reception in a carriage pursuant to the principles of the present invention;

FIG. 4 is a perspective view of a stylus arm unit which is enclosed within the cartridge of FIGS. 1, 2, and 3;

FIGS. 5 and 6 are, respectively, a side view and a front view of the stylus arm unit of FIG. 4;

Figure 3:
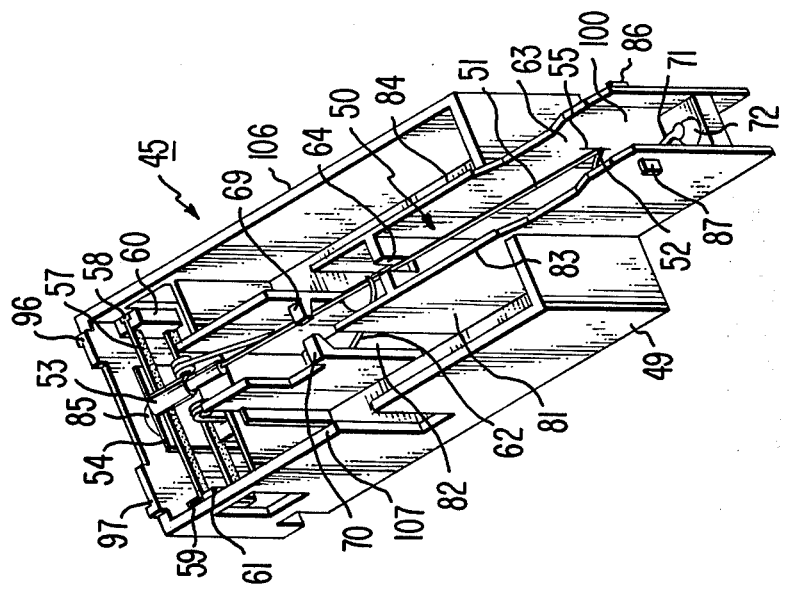
FIGS. 2 and 3 are, respectively, top and bottom perspective views of the cartridge of FIG. 1.
Figure 2:
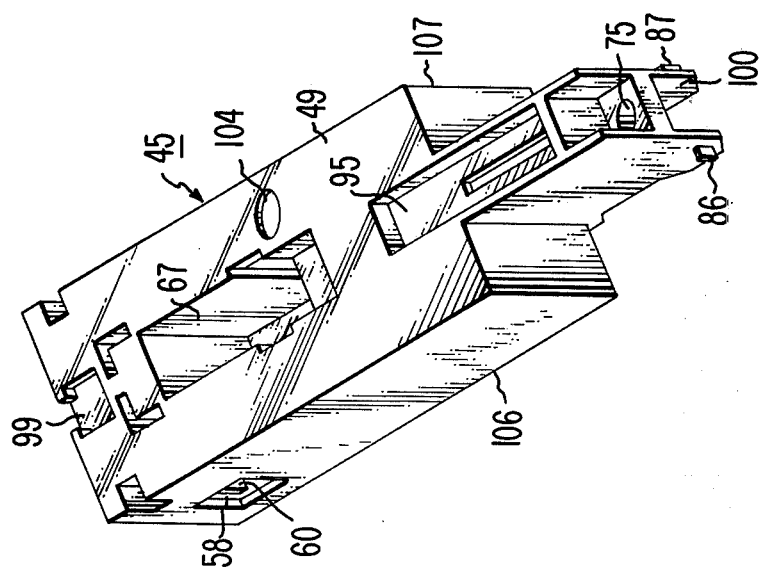
Figure 14:
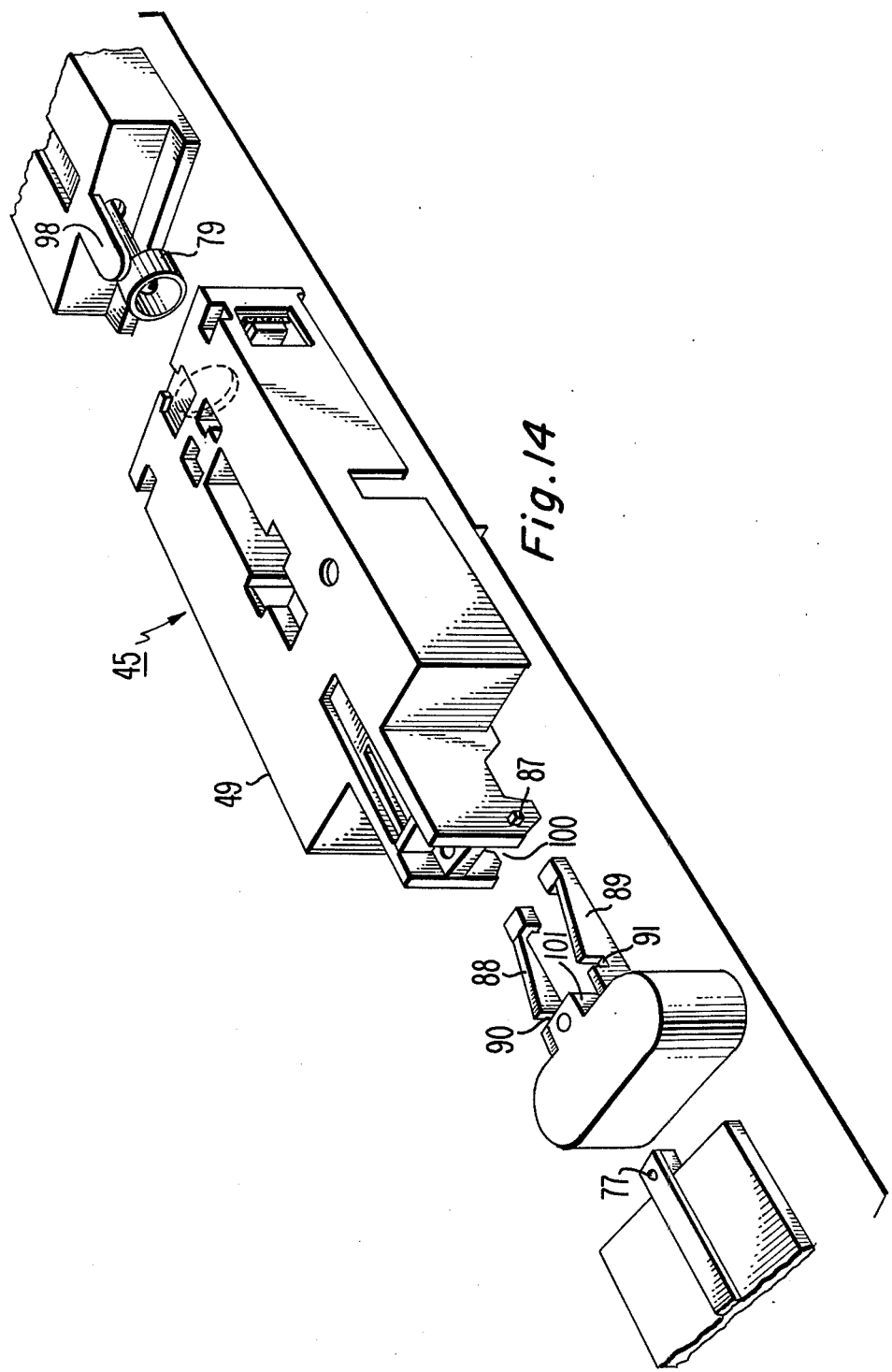
Figure 15:
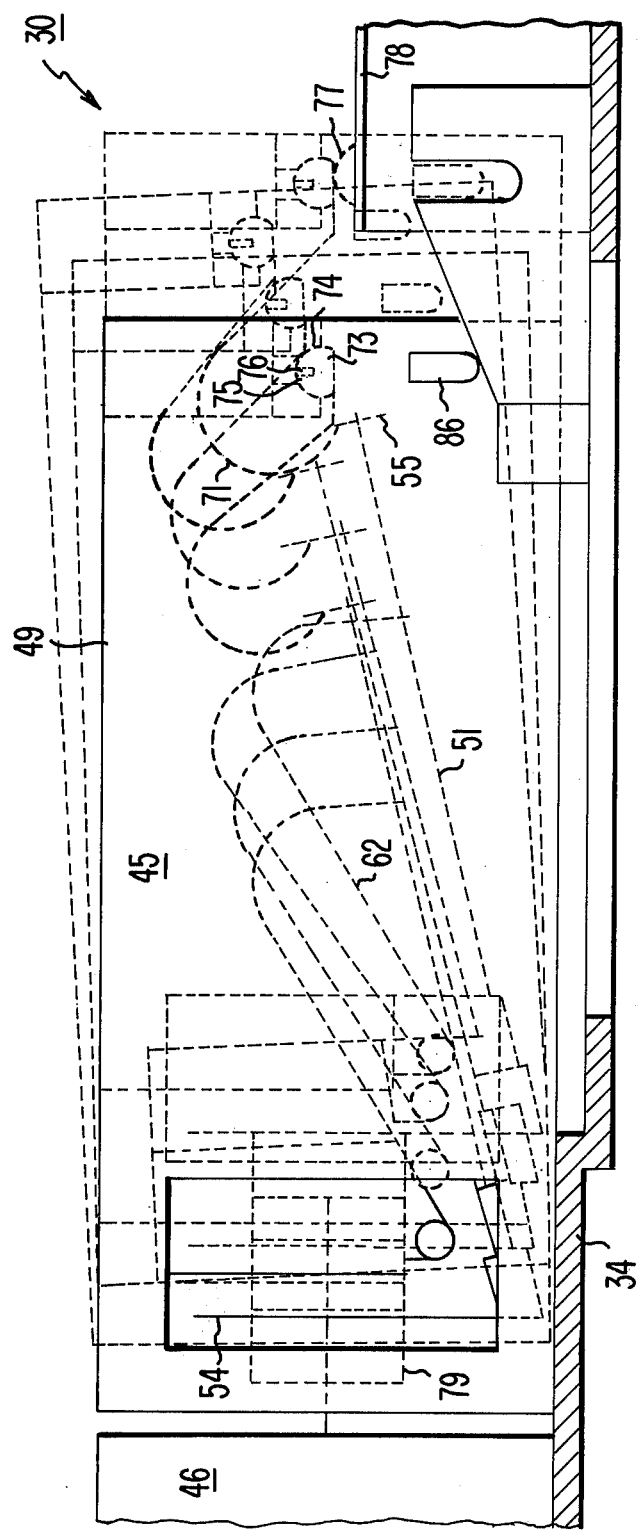

FIG. 14 provides an exploded view of the cartridge of FIGS. 1-3 and cooperating structures of the carriage in which it is received; and FIG. 15 diagrammatically illustrates a sequence of cooperation between the cartridge and carriage structures of FIG. 14 during cartridge installation.

In FIG. 1, numeral 30 indicates a video disc playback system of the general type shown in the U.S. Pat. No. 3,842,194 (Clemens). A record 31 is rotatably mounted for playback on a turntable 32 secured to a motorboard 33 of the playback system. A carriage 34 is mounted for lateral motion relative to the motorboard 33 in correlation with lateral motion of a stylus 55 (FIG. 4) riding in a spiral groove 35 disposed on the surface of the record 31 during playback. Slots 36 and 37 are provided in the motorboard 33 to permit such lateral motion of the stylus housing 34 during playback, as well as lateral motion between an off-record rest position 38 and the over-record play positions. Reference may be made to the U.S. Pat. No. 3,870,835 (Stave) for illustration of an apparatus for laterally driving the stylus housing 34 in correlation with the groove-riding stylus during playback. When the stylus housing 34 is in the off-record rest position 38, a hinged plate 40 conceals the stylus housing.

There are five basic chambers in the stylus housing 34. Chambers 41, 42, and 43 are for enclosing respective circuit boards for respective elements of the signal processing circuitry of the playback system: (a) resonator (forming a tuned circuit with the stylus electrode/record capacitance); (b) oscillator (supplying UHF oscillations to the tuned circuit); and (c) preamplifier (responding to the detected version of modulated oscillations derived from the tuned circuit). Chamber 44 contains a replaceable stylus arm cartridge 45, a retractable armstretcher 46, and a stylus arm lifter 47. The armstretcher may be of the type shown in U.S. Pat. No. 3,711,641 (Palmer). The stylus arm lifter 47 is illustratively of the type shown in a copending U.S. Pat. application, Ser. No. 667,309, of J. Bleazey, et al., entitled, STYLUS ARM LIFTING/LOWERING APPARATUS FOR A VIDEO DISC PLAYER, and filed concurrently herewith. The Bleazey, et al. application has been assigned of record to the assignee of the instant application. Chamber 48 forms a wiring channel to hold the lead wires to the various circuit boards.

Figure 7:
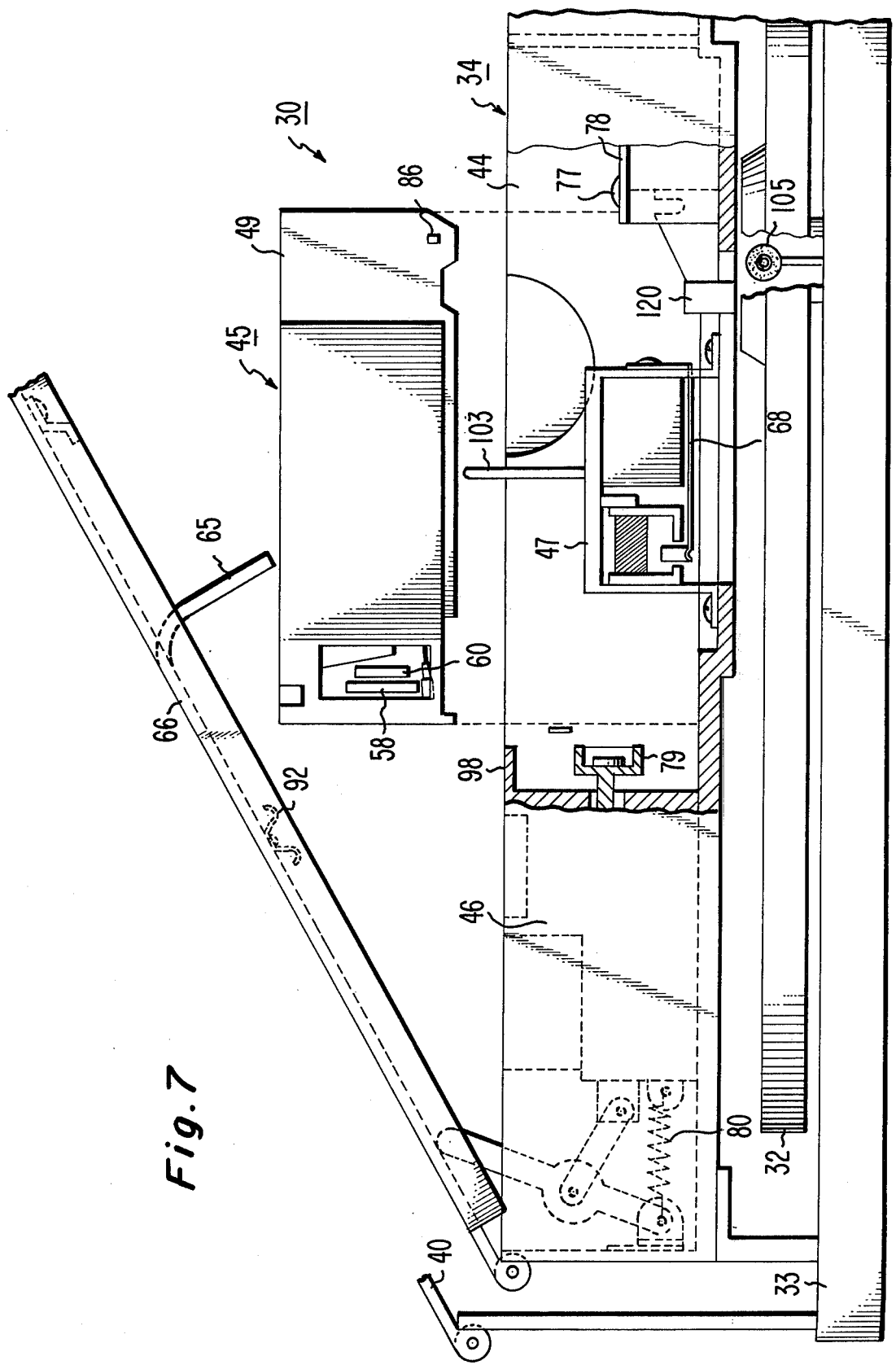
FIGS. 7-13 illustrate, a seriatim, operations involved in installing the cartridge of FIGS. 1-3 in the carriage of FIG. 1.

FIGS. 2 and 3 are the top and bottom perspective views of the cartridge 45. The cartridge 45 includes a body 49 for housing an insert molded stylus arm unit 50 shown in FIGS. 4, 5, and 6. The insert molded stylus arm unit 50 consists of a stylus arm 51 formed of an aluminum tube (e.g., 0.024 inch outer diameter and 0.002 inch thickness) with a plastic stylus holder 52 molded at the other end of the stylus arm and a compliant member 53 molded at the other end of the stylus arm to connect the stylus arm with a metal connector plate 54. The angle between the stylus arm 51 and the connector plate 54 is illustratively 94°, for reasons given subsequently. The plastic stylus holder 52 contains a slot to hold the stylus 55 when it is glued in place. A small projection 56 is molded at the top of the plastic stylus holder 52, and serves to engage with an abutment 120 (FIG. 7) to relieve the stylus 55 from a locked groove, as explained more fully in the copending application Ser. No. 667,308, of M. A. Leedom entitled, PICKUP CARTRIDGE, and filed concurrently herewith. The Leedom application, Ser. No. 667,308, is assigned of record to the assignee of the instant application.

The arrangement for suspending the stylus arm unit 50 in the cartridge is of the form disclosed in the copending U.S. patent application, Ser. No. 667,420, of J. Allen entitled, VIDEO DISC PLAYBACK SYSTEM AND PICKUP CARTRIDGE THEREFOR, and concurrently filed herewith. The Allen application, Ser. No. 667,420, has been assigned of record to the assignee of the instant application. As shown in FIG. 3, an elastic diaphragm 57 is glued to the connector plate 54 of the stylus arm unit 50. The diaphragm 57 comprises a pair of straps joining a pair of end ribs 58 and 59. The elastic straps have central projections of appropriate wedge shapes providing slanted rear surfaces to which the connector plate 54 is glued. The slanted rear surfaces establish an 8° angle between the connector plate 54 and the forward surfaces of the elastic straps.

A pair of hooks 60 and 61 are molded into the rear end of the cartridge body 49. In order to secure the diaphragm 57 to the cartridge body 49, the end ribs 58 and 59 are stretched apart and drawn over the hooks 60 and 61. The hooks 60 and 61 have slots for seating the end ribs 58 and 59. When the diaphragm 57 is properly secured to the cartridge body 49, the slots establish a desired angular orientation of the front surfaces of the elastic straps with respect to the cartridge body 49 (e.g., perpendicular to the bottom surface of the cartridge body).

Figure 8:
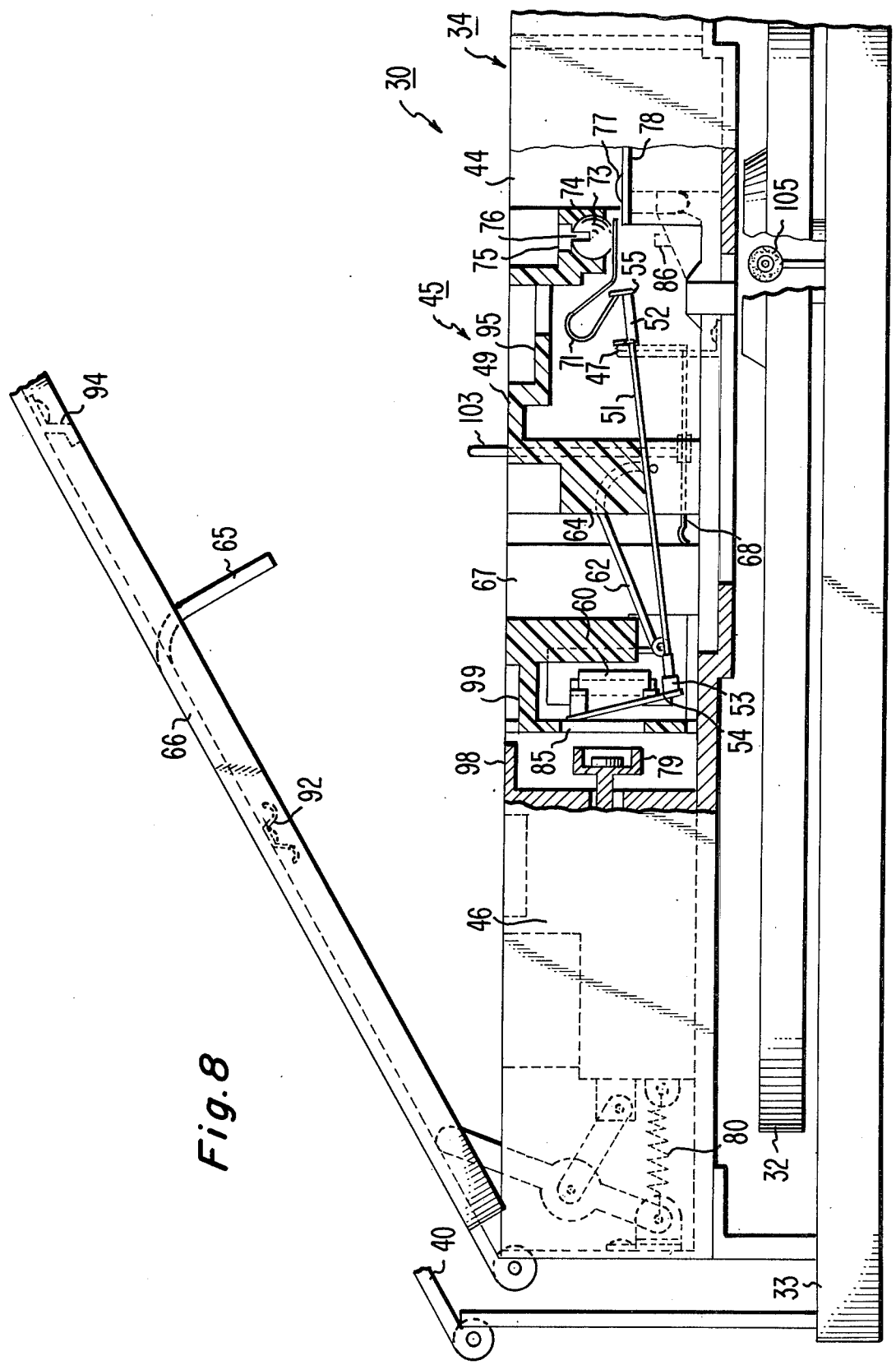
Figure 12:
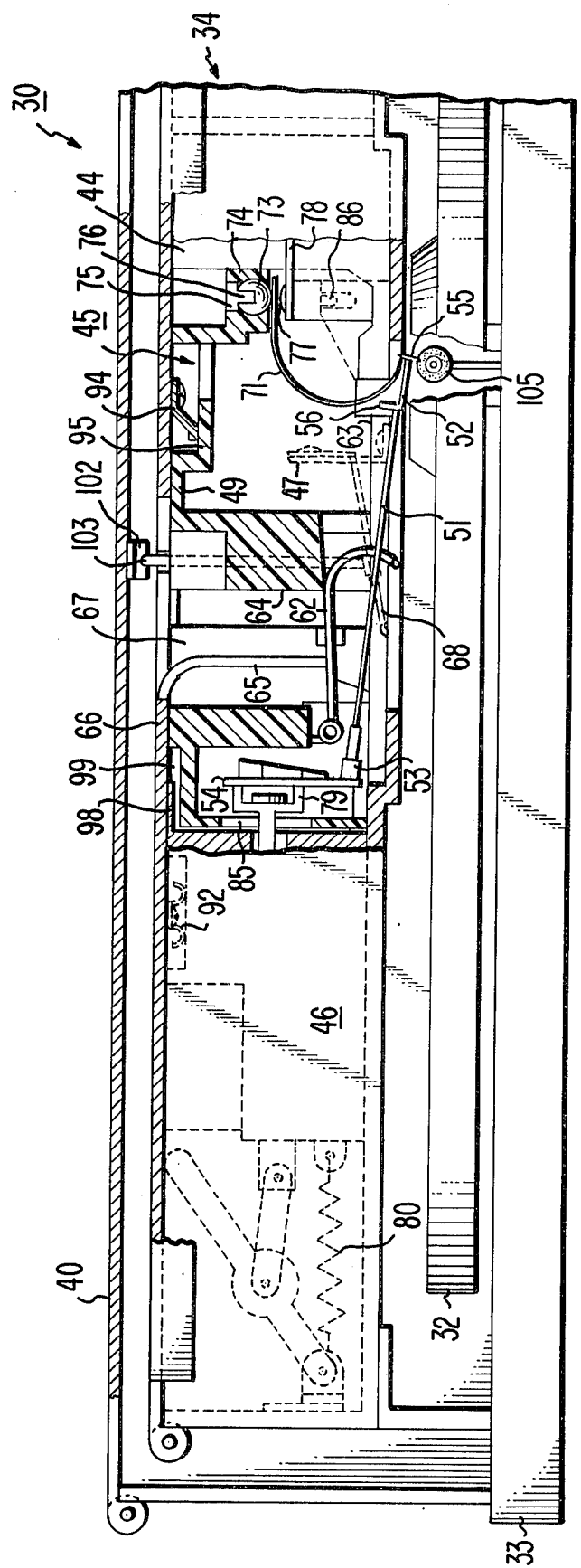
Figure 13:
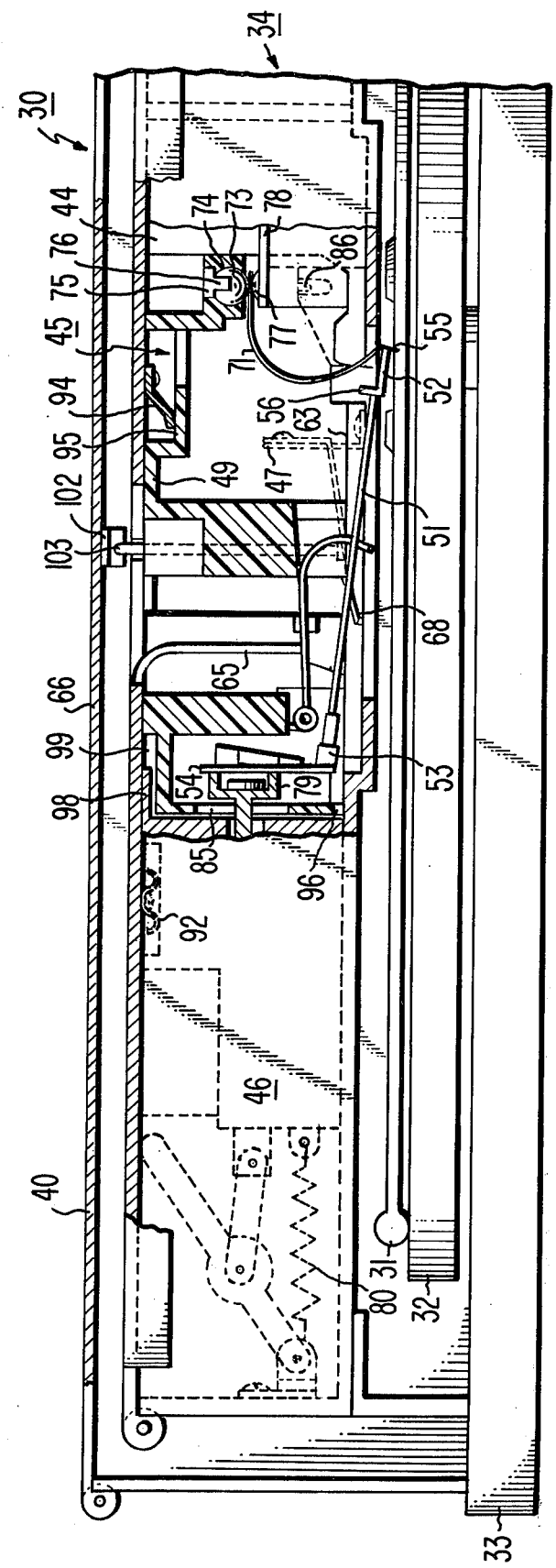

A U-shaped spring 62 releasably clamps the stylus carrying end of the stylus arm 51 in a retracted position in the cartridge body 49, as shown in FIGS. 3 and 8, during storage and handling of the cartridge 45 (e.g., outside the carriage compartment). The retracted position provides a location for the stylus 55 withdrawn within the confines of the cartridge body 49, remote from an opening 63 (FIG. 3) in the cartridge body through which the stylus protrudes when the stylus housing 34 is in the off-record rest position 38 (FIG. 12) and the play position 39 (FIG. 13).

Figure 9:
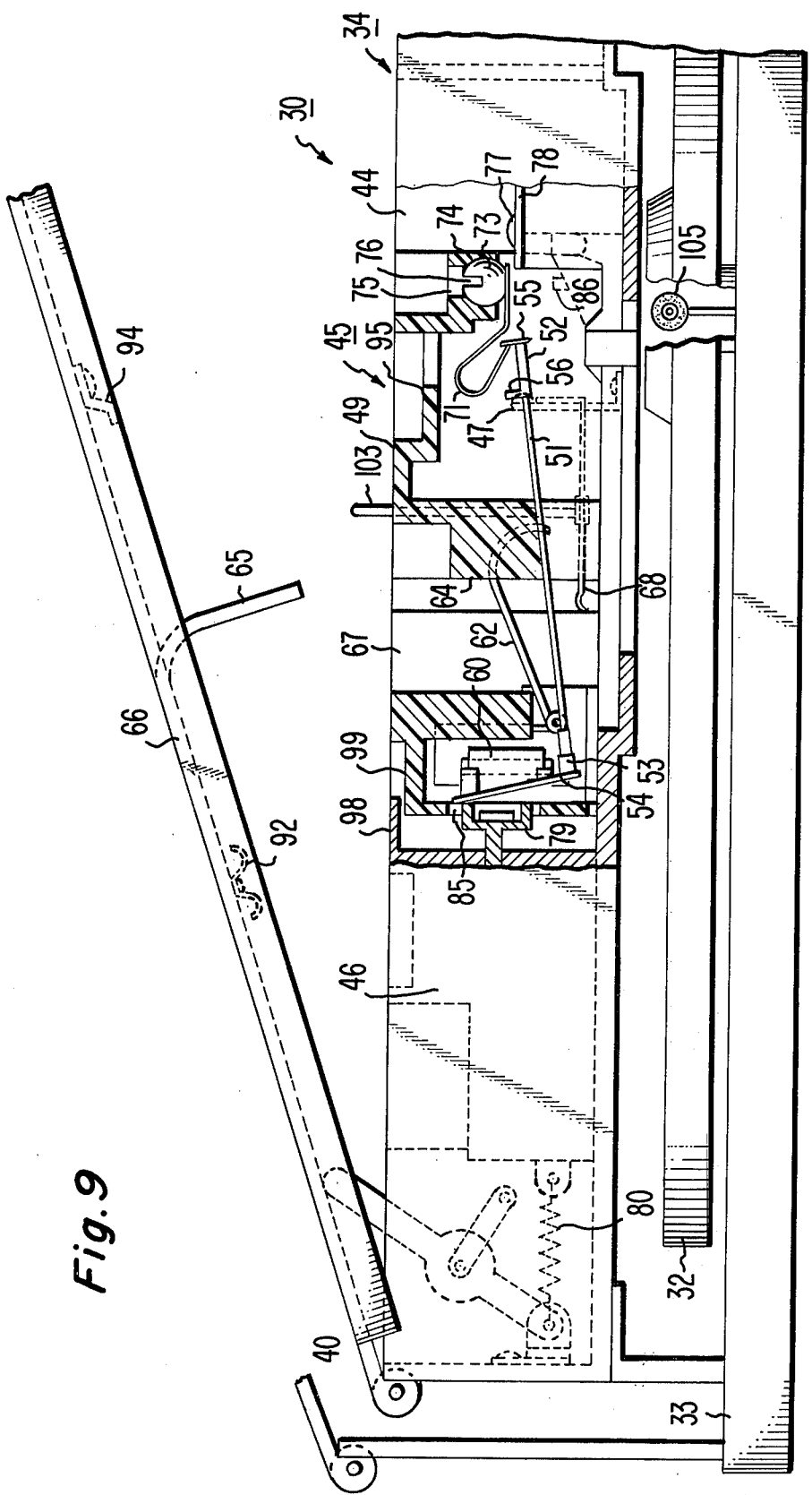

The angular orientation of the front surfaces of the elastic straps 58 and 59 relative to the cartridge body 49 (e.g., perpendicular to the bottom surface of the cartridge body), the angular orientation of the connector plate 54 relative to the front surfaces (e.g., 8°), and the angular orientation of the compliant member 53 relative to the connector plate (e.g., 94°) are such that, when the stylus arm 51 is held in a retracted position in the cartridge body, the compliant member is axially aligned (i.e., relaxed because not bent) with the stylus arm, as shown in FIGS. 8 and 9, although the stylus arm is well up into the cartridge body for protection. Axial alignment of the compliant member 53 with the stylus arm 51 is advantageous because it prevents formation of a set in the compliant member during storage and handling of the cartridge 45 which may interfere with the ability of the stylus 55 to track the record groove.

The U-shaped clamping spring 62 has a pair of spaced leg portions and a cross portion joining the spaced leg portions. The spaced leg portions are bent to define an arched portion. The end portions of the spaced leg portions are secured in the cartridge body 49.

Figure 10:
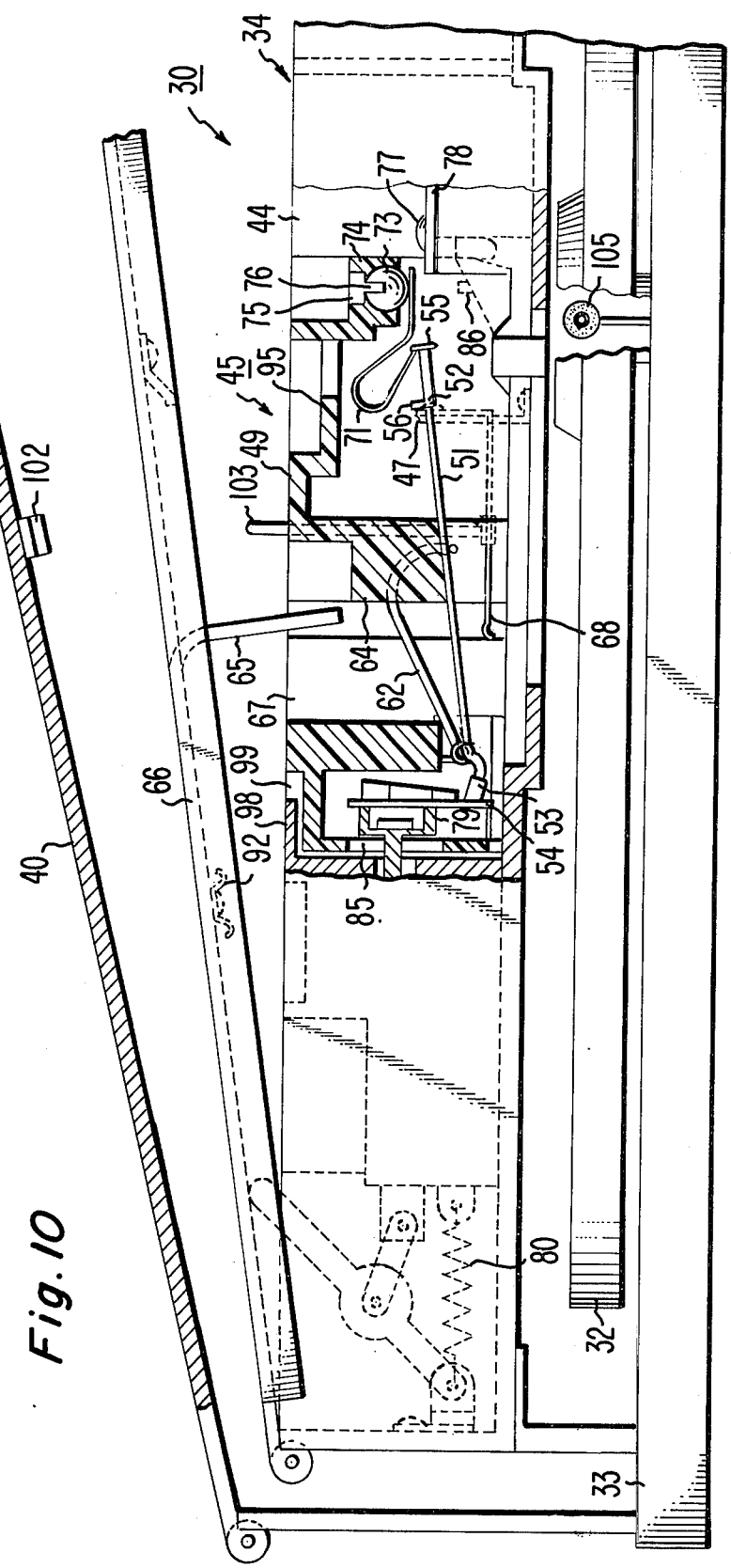
Figure 11:
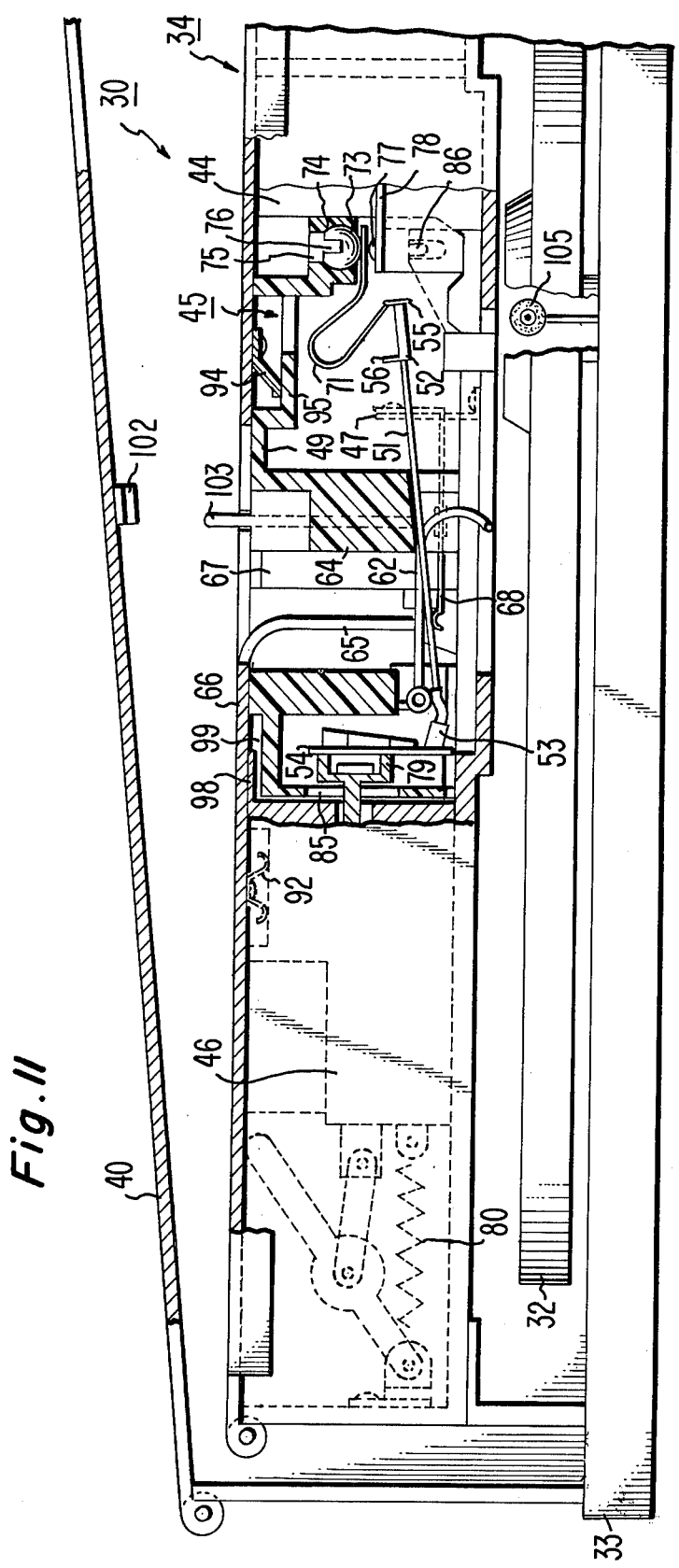

The clamping spring 62 is locatable in one of three positions. In the top position, as shown in FIGS. 8-10, the stylus arm 51 is held in a retracted position against a stop 64. The middle position is caused by depression of the clamping spring 62 by a spring defeat lever 65 of a hinged lid 66 of the carriage 34 when the lid is closed during containment of the cartridge 45 in the carriage compartment 44, as shown in FIGS. 11-13. The defeat lever 65 enters the interior of the cartridge body 49 through an opening 67 in the cartridge body, as shown in FIG. 2, to depress the clamping spring 62. In this position, the clamping spring 62 is completely out of the way of the stylus arm 51 so that a separately controlled rod 68 of the stylus arm lifter 47 (FIGS. 1 and 7) can control the stylus arm during normal play cycles, as shown in FIGS. 11-13.

The bottom position is for manufacturing purposes. When the clamping spring 62 is depressed beyond its normal middle position, the spaced leg portions latch over projections 69 and 70 (FIG. 3) on the inner walls of the cartridge body 49 to anchor the clamping spring in a locked position until purposefully released. In this position, the shoe of the stylus 55 can be lapped on a drum lapper, or examined under a microscope without interference from the clamping spring 62.

The arched shape of the clamping spring 62 enables depression thereof by the defeat lever 65 of the stylus housing lid 66 during containment of the cartridge 45 in the stylus housing compartment 44 without any interference with the stylus arm 51. Further, the arched shape of the clamping spring 74 permits greater tolerance in the length of the defeat lever 65 without affecting satisfactory operation of the clamping spring defeat mechanism. Additionally, the U-shape of the clamping spring 62 facilitates assembly of the stylus arm unit 50 in the cartridge 45.

The cartridge 45 further includes (as in the aforementioned Dholakia application) a leaf spring 71, in the form of a ribbon, for urging the stylus 55 into the record groove during playback. One end of the leaf spring 71 is secured to the stylus 55 as shown in FIG. 5. The second end of the leaf spring 71 is secured to a flat 72 on a portion of a ball 73. The ball 73 is friction loaded into a socket 74 provided in the front end of the cartridge body 49 so that the flat 72 of the ball protrudes from the socket. The cartridge body 49 has an access opening 75 in communication with the socket 74 for inserting a tool into a hex-shaped hole 76 provided in the ball 73 for the purpose of adjustment of the ball orientation. Such adjustment may, for example, serve to adjust the lateral position of the stylus arm 51 in the cartridge body 49, and/or to vary the stylus/record tracking pressure, as explained in the copending U.S. Pat application, Ser. No. 667,396, of B. K. Taylor, et al., entitled, STYLUS ADJUSTMENT APPARATUS FOR A VIDEO DISC PLAYER, and filed concurrently herewith. The Taylor, et al., application has been assigned of record to the assignee of the instant application. After such adjustment at the factory, the ball 73 may be firmly glued in place.

The leaf spring 71 is made of conductive material to provide an electrical path between an electrode formed on stylus 15 and signal processing circuitry contained in carriage 34. A contact button 77 is provided on a resonator circuit board 78 (FIG. 7) for contacting the second end of the leaf spring 71 during containment of the cartridge 45 in the carriage compartment 44, as shown in FIGS. 11-13.

FIGS. 7-13 illustrate, in sequence, operations involved in installation of the cartridge 45 in the carriage compartment 44. From FIG. 7, it can be seen that the armstretcher 46 has a support member 79 for engagement with the connector plate 54 of the cartridge 45 during containment thereof in the compartment. As indicated previously, the armstretcher 46 serves the velocity correcting purposes of armstretcher apparatus, as generally disclosed in U.S. Pat. No. 3,711,641 (Palmer). The armstretcher 46 is slidably mounted in the carriage compartment 44 for movement between a withdrawn position when the carriage lid 66 is open (FIG. 7) and an advanced position when the carriage lid is closed (FIGS. 11-13), in response to the motion of the carriage lid. The operation of the linkage that moves the armstretcher 46 can be seen from FIGS. 7-13. A coil spring 80 connected between the armstretcher 46 and the carriage 34 returns the armstretcher to the withdrawn position when the carriage lid 66 is opened.

The cartridge 45 is placed in the carriage compartment 44 while the stylus housing lid 66 is open, as shown in FIG. 8. The cartridge 45 has a compartment 81 (FIG. 3) which overlies the stylus arm lifter 47 during containment of the cartridge in the stylus housing compartment 44. An opening 82 (FIG. 3) is provided in the inner wall 83 of the cartridge 45 for permitting manipulation of the stylus arm 51 by the controlled rod 68 of the stylus arm lifter 47.

Initial engagement of the support member 79 with the connector plate 54, as closing of lid 66 is initiated, can be seen from FIG. 9. The support member 79 enters the interior of the cartridge body 49 through an opening 85 (FIG. 9) for engagement with the connector plate 54. As the armstretcher 46 moves forward, the support member 79 moves the connector plate 54 from initial tilted position (e.g., 8°) to a position matching the engaging surface of the support member (e.g., perpendicular to the bottom surface of the cartridge body 49) as shown in FIG. 10. The elastic diaphragm 57 permits the connector plate 54 to straighten up.

The coupling provided between the support member 79 and the connector plate 54 is illustratively of a magnetic form, as disclosed in U.S. Pat. application, Ser. No. 667,388, of M. A. Leedom, entitled, RELEASABLE STYLUS ARM MAGNETIC COUPLING, and concurrently filed herewith. The Leedom application, Ser. No. 667,388, is assigned of record to the assignee of the instant application.

As the carriage lid 66 is closed further, the defeat lever 65 enters the interior of the cartridge 49 through the opening 67 to depress the clamping spring 62, as shown in FIG. 11. When the clamping spring 62 is depressed, the stylus arm 51 drops downward to rest on the rod 68 of the stylus arm lifter 47.

As the armstretcher 46 moves from the location in FIG. 10 to the location in FIG. 11, the cartridge 45 is pushed forward so that the second end of the leaf spring 71 engages the contact button 77 of the resonator circuit board 78. To prevent shearing motion between the second end at the leaf spring 71 and the contact button 77, the cartridge 45 has a pair of lug portions 86 and 87 (FIGS. 2-3). The carriage 34 is provided with a pair of ramp portions 88 and 89 (FIG. 14) for engagement with the cartridge lug portions 86 and 87 during the forward motion of the cartridge 45, so that the second end of the leaf spring 62 is lifted away from the contact button 77 during the forward motion, as shown in FIG. 15. The ramp portions have slots 90 and 91 (FIG. 14) for receiving the lug portions 86 and 87 when the second end of the leaf spring 71 overlies the contact button 77 to establish electrical connection therebetween without undesirable shearing motion.

When the carriage lid 66 is closed, a spring 92, secured to the carriage lid, presses the armstretcher 46 down into the carriage compartment 44 to establish proper seating of the armstretcher, as shown in FIG. 11. From FIG. 1, it can be seen that a spring 93, secured to the carriage compartment 44, presses the armstretcher 46 against the sidewall of the carriage compartment to assure lateral alignment of the armstretcher.

Another spring 94, secured to the carriage lid 66, presses against a depressed ledge 95 (FIG. 2) of the cartridge 45, when the carriage lid is closed, to assure proper seating of the cartridge in the carriage compartment 44 and to assure the desired positive contact between the second end of the leaf spring 71 and the contact button 77, as shown in FIG. 11. Further, in order to assure stable mounting of the cartridge 45 in the carriage compartment 44, the cartridge is supported at three points therein. In addition to resting on the contact button 77 of the resonator circuit board 78 at the front end, the cartridge 45 is provided with two feet 96 and 97 at the rear end for engagement with the bottom of the carriage compartment, as shown in FIGS. 3 and 11.

In order to assure lateral alignment of the rear end of the cartridge 45 with the armstretcher 46, the armstretcher has a projection 98 which enters a recess 99 provided in the rear end of the cartridge during relative motion between the armstretcher and the cartridge as shown in FIGS. 1, 9, and 10.

Further, in order to assure lateral alignment of the front end of the cartridge 45 with the contact button 77, the cartridge has a cavity 100 (FIG. 2) at the front end for receivig a projection 101 (provided in a base for the resonator circuit board 78) during relative motion between the cartridge and the carriage 34 as shown in FIGS. 1 and 14.

The hinged plate 40 is closed after closing the stylus housing lid 66, as shown in FIG. 12. When the hinged plate 40 is closed, a projection 102 secured to the hinged plate depresses a plunger 103 connected with the rod 68 of the stylus arm lifter 47. An aperture 104 (FIG. 2) is provided at the top of the cartridge body 49 to permit passage of the plunger 103, as shown in FIG. 1.

When the carriage 34 is beneath plate 40 in the off-record position (i.e., position 38, shown in dotted lines in FIG. 1), the stylus 55 protrudes through the carriage bottom opening because of the depression of the rod 68 by the plunger 103, and rests on a stylus brush 105, as shown in FIG. 12. When the carrage 34 moves from the off-record rest position toward a play position 39, the rod 68 lifts the stylus arm 51, as depression of the plunger 103 is no longer maintained by the projection 102. When the carriage 34 reaches a desired play position (e.g., position 39, shown in solid lines in FIG. 1), activation of the stylus arm lifter 47 to lower the rod 68 permits stylus 15 to rest on the record 31, as shown in FIG. 13.

The angular orientation of the connector plate 54 with respect to the cartridge body 49, when the connector plate is rigidly engaged with the support member 79 during containment of the cartridge body in the carriage compartment 44, (i.e., connector plate being perpendicular to the bottom surface of the cartridge body), and the angular orientation of the compliant member 53 with respect to the connector plate (e.g., 94°), is such that, when the stylus 55 is resting on the stylus brush 105 (FIG. 12) or the record 31 (FIG. 13), the compliant member is in substantial axial alignment with the stylus arm 51. Axial alignment of the compliant member 53 with the stylus arm 51, as indicated previously, prevents formation of a set in the compliant member during containment of the cartridge 45 in the carriage compartment 44. Thus, compliant member is in unstressed condition while the cartridge is outside the carriage compartment, and also while the cartridge is contained in the carriage compartment and the carriage is in the off-record rest position or in the play position.

An aperture 106 (FIG. 3) in the outer wall 107 of the cartridge body 49 permits passage of wiring between the stylus arm lifter 47 and the wiring channel 48. From FIG. 3, it can be seen that the inner walls 83 and 84 of the cartridge body 49 closely flank the stylus arm unit 50 to limit access thereto. The keyed shape and solid cover of the cartridge 45 prevents backward or inverted insertion of the cartridge into the carriage compartment 44.

What is claimed is:

1. In a system for playing a video disc record, a pickup apparatus comprising:
   A. a carriage for housing a signal processing circuit; said signal processing circuit including an input terminal;
   B. a cartridge body for housing a stylus and an electrical connection between an electrode on said stylus and a terminal on said cartridge body; and
   C. means for removably mounting said cartridge body on said carriage in a manner effecting an electrical connection between said cartridge terminal and said input terminal; said means including a cam surface presented by said carriage for engagement with a portion of said cartridge body to hold said cartridge terminal spaced from said input terminal until said cartridge terminal is aligned with said input terminal.

2. In a system for playing back prerecorded signals from a spirally grooved record; said system including a turntable for rotatably supporting said record and a carriage mounted for lateral motion relative to a base plate of said system in correlation with lateral motion of a groove-riding stylus during playback; said carriage having a compartment which has an aperture for permitting said stylus to protrude for engagement with said record during playback; said groove-riding stylus including an electrode; said system further including a support member located within said carriage; said system also including a signal processing circuit having an input terminal located with said carriage; an apparatus comprising:
   A. a stylus arm unit including:
      a. a stylus arm carrying said stylus at one end thereof;
      b. a connector plate; and
      c. a compliant member securing said connector plate to the end of said stylus arm remote from said one end;
   B. a cartridge body having walls defining a protective enclosure for said stylus arm unit; said cartridge body being dimensioned for reception in said carriage compartment;
   C. means for flexibly suspending said connector plate within said cartridge body; said suspending means establishing a location of said connector plate permitting a rigid engagement thereof with said support member when said cartridge body is received in said carriage compartment;
   D. a spring for urging said stylus into said record groove during playback; said spring being conductive; said spring having a first end and a second end; said first end of said spring being secured to said stylus so as to effect an electrical connection between said first and said stylus electrode;
   E. means for securing said second end of said spring within said cartridge body above said stylus; said securing means establishing a location for said second end of said spring permitting lateral alignment thereof with said input terminal when said cartridge body is received in said carriage compartment;
   F. means for providing displacement of said cartridge body toward said input terminal subsequent to cartridge reception in said carraige compartment;
   G. means for spatially separating said second end of said spring from said input terminal during said displacement of said cartridge body in a direction perpendicular to said displacement; and
   H. means for causing engagement of said second end of said spring with said input terminal when said second end of said spring is aligned with said input terminal during said displacement of said cartridge body to effect an electrical connection between said second end of said spring and said input terminal.

3. An apparatus as defined in claim 2 wherein said spatially separating means comprises a ramp secured to said carriage for engagement with a projecting portion of said cartridge body to elevate said second end of said spring with respect to said input terminal during said displacement of said cartridge body.

4. A apparatus as defined in claim 3 wherein said engagement causing means comprises a pocket provided in said ramp for receiving said projecting portion of said cartridge body when said second end of said spring overlies said input terminal during said displacement of said cartridge body to permit lowering of said second end of said spring to establishing said electrical connection.

5. An apparatus as defined in claim 3 wherein said cartridge body has another portion for engagement with a cooperating portion provided in a structure associated with said input terminal for laterally aligning said cartridge boyd with respect to said input terminal during said displacement of said cartridge body.

6. A system as defined in claim 5 further including means mounted in said carriage for causing translatory motion of said support member during said rigid engagement with said connector plate for varying the position of said stylus along said spiral groove during playback in a manner that opposes deviations of the stylus/groove relative speed from a predetermined speed; and wherein said displacement providing means also serves to provide movement of said translatory motion causing means toward said cartridge body to effect said rigid engagement between said connector plate and said support member; and wherein said translatory motion causing means includes a portion for engagement with a cooperating portion provided in said cartridge body during said movement of said translatory motion causing means.

* * * * *

UNITED STATES PATENT OFFICE
CERTIFICATE OF CORRECTION

PATENT NO. : 4,038,682
DATED : JULY 26, 1977
INVENTOR(S) : JAMES AUSTIN ALLEN

It is certified that error appears in the above-identified patent and that said Letters Patent are hereby corrected as shown below:

| | |
|---|---|
| Column 4, line 5 | change "set" to --"set"-- |
| Column 5, line 22 | change "armstretcher" to --"armstretcher"-- |
| Column 6, line 51 | change "receivig" to --receiving-- |
| Column 6, line 63 | between "record position" insert --rest-- |
| Column 6, line 67 | change "carrage" to --carriage-- |
| Column 7, line 67 | change "with" to --within-- |
| Column 8, line 23 | [the last line of Claim 2 (D)] between "end said" insert --and-- |
| Column 8, line 32 | [Claim 2 (F)] change "carraige" to --carriage-- |
| Column 8, line 55 | change "establishing" to --establish-- |
| Column 8, line 62 | change "boyd" to --body-- |

Signed and Sealed this

Twenty-ninth Day of August 1978

[SEAL]

Attest:

RUTH C. MASON
Attesting Officer

DONALD W. BANNER
Commissioner of Patents and Trademarks